Aug. 28, 1956  S. GUARNASCHELLI  2,760,753
LEAKPROOF HIGH PRESSURE VALVE
Filed Oct. 7, 1952  2 Sheets-Sheet 2
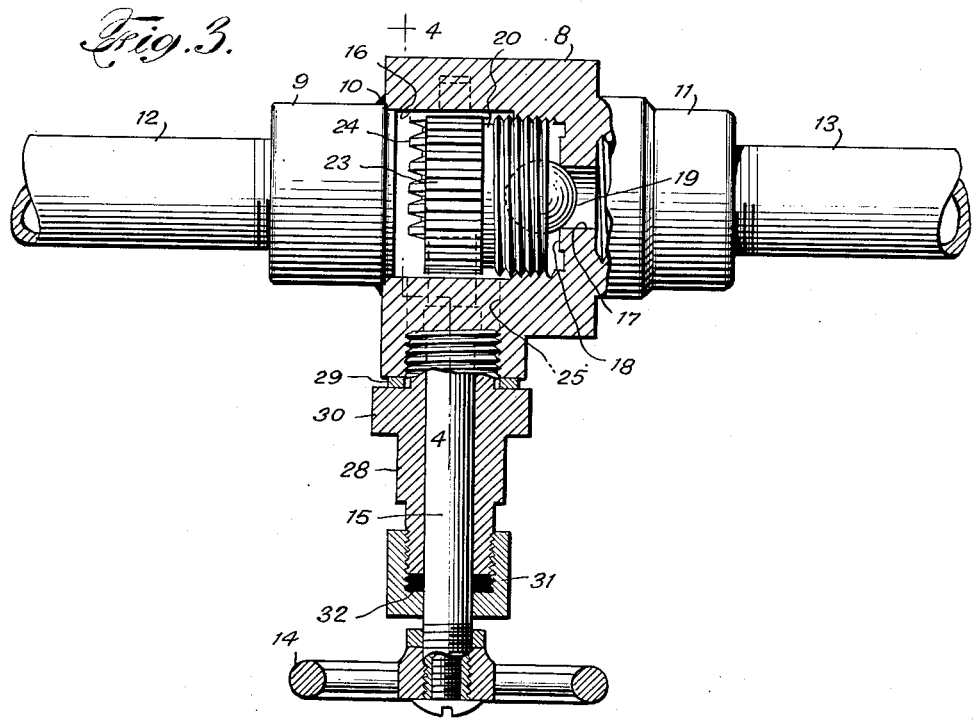
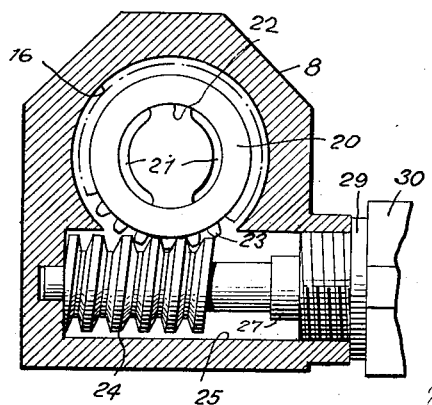
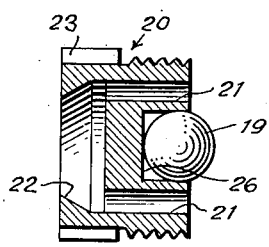
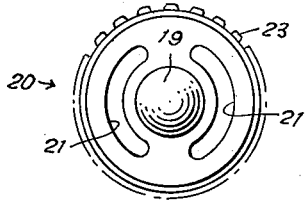
INVENTOR.
Stephen Guarnaschelli
Emery, Varney, Whittemore & Dix
BY
ATTORNEYS

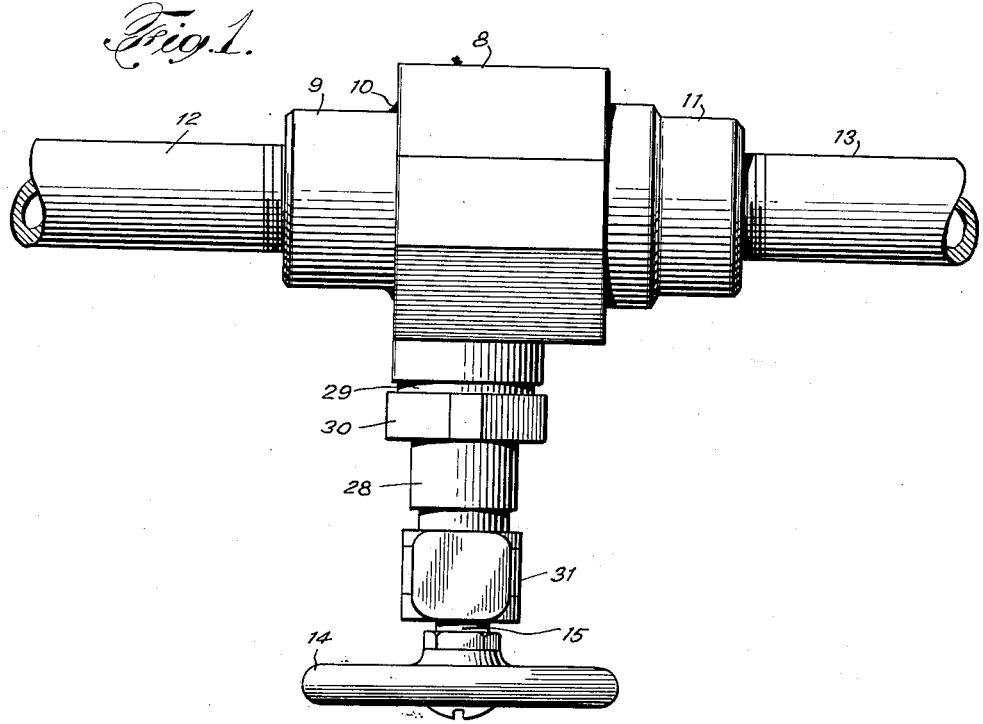
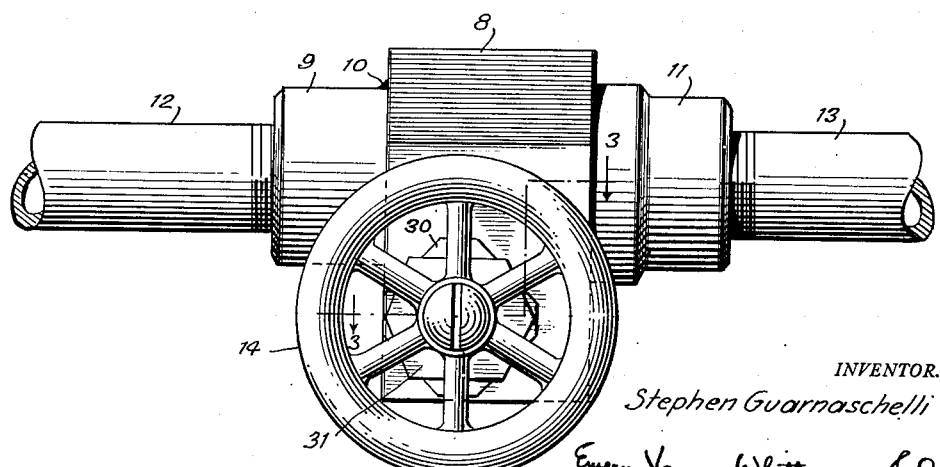

United States Patent Office 2,760,753
Patented Aug. 28, 1956

2,760,753

LEAKPROOF HIGH PRESSURE VALVE

Stephen Guarnaschelli, Garden City, N. Y.

Application October 7, 1952, Serial No. 313,389

5 Claims. (Cl. 251—229)

This invention relates to valves, and more particularly to valves for controlling the flow of fluid in high pressure hydraulic lines.

It is an object of the invention to provide valves which may be used for pressures up to 10,000 p. s. i. or more, and which do not leak at high pressures. Another object is to provide valves in which the valve seats will not become scorched or scored after repeated closing and opening over long periods of time. Still another object is to provide reduction gear operated valves in which the gear is enclosed within the high pressure line. A further object of the invention is to provide valves for high pressure lines which have a low resistance to the flow of fluid therethrough when the valve is open. It also is an object to provide valves which are simple in construction and which may be easily and economically manufactured. Other objects and advantages of the invention will appear hereinafter.

A preferred embodiment of the invention selected for purposes of illustration is shown in the accompanying drawings, in which:

Figure 1 is a top plan view of the valve, showing pipes connected to the inlet and outlet passages;

Figure 2 is a side elevation of the valve and connected pipes shown in Figure 1;

Figure 3 is a view similar to Figure 1, but showing the valve structure in section taken substantially on the broken line 3—3 of Figure 2;

Figure 4 is a sectional view through the valve taken substantially on the broken line 4—4 of Figure 3;

Figure 5 is a longitudinal sectional view through the valve mount; and

Figure 6 is an end view of the valve mount as viewed from the right in Figure 3.

The use of increasingly high pressures in hydraulic lines for operating machinery such as presses, landing gears for airplanes, and the like, has demonstrated weaknesses and objections in valves heretofore available for controlling the fluid flow in such lines. Pressures may reach several thousand p. s. i. and the problem of providing mechanically strong leakproof valves for use at such pressures is a serious one. The valves often are of complicated design, are costly to manufacture and service, and in some cases are difficult and slow to operate. The ground and lapped valve seats conventional in such valves increase the cost of the valves, and the valve seats are subject to scorching or scoring, thus interfering with successful operation of the valves and necessitating frequent repair or replacement. Moreover, in many cases the valves, when open, impose an undesirably high resistance to the flow of fluid therethrough.

Referring first to Figure 1 and 2 of the drawings, 8 designates the valve body, preferably formed from a piece of steel so as to be able to withstand the high pressures for which the valve is intended. This might be a piece of bar stock. The chamber within the valve body which contains the valve, the valve mount and the valve operating mechanism is closed by a collar 9, also preferably formed from steel and shouldered as shown in Figure 3 to fit the opening in the valve body. This collar is permanently secured to the valve body in the course of manufacturing the valve, as by a circumferential weld 10. The collar 9 and the oppositely disposed portion 11 of the valve body provide the inlet and outlet passages for the fluid. The collar 9 and the portion 11 of the valve body may be internally screw-threaded for connection, respectively, to the pipes 12 and 13 constituting the pipe line in which the flow of fluid is to be regulated by the valve. In the illustrative embodiment the valve within the valve body is operated by turning the hand wheel 14 secured on the stem 15 extending through an opening in the side of the valve body, but it will be obvious that motor operated mechanism may be connected to the stem for closing and opening the valve.

Figures 3 and 4 show the interior construction of the valve body. A bore 16 is drilled into one end of the valve body 8 to provide the valve chamber. A port 17 of reduced diameter, coaxially disposed in the end of the valve chamber bore, communicates with the fluid passage in the portion 11 of the valve body. The end wall of the valve chamber surrounding the port 17 provides a flat valve seat. No grinding or lapping of this valve seat is necessary.

The valve 19, a hard steel ball of diameter somewhat larger than the port 17, is secured in the end of the cylindrical valve mount 20 facing the valve seat. For example, if the diameter of the port is ½ inch, the diameter of the ball valve may be about ⅝ inch. Preferably the hard steel ball 19 has a pressed fit in a bore 26 in the end of the valve mount, as shown in Figure 5, the diameter of this bore being made about 1/64 inch less than the diameter of the ball.

The inner end of the valve chamber bore 16 is screw-threaded and the end of the valve mount in which the ball valve is secured is externally screw-threaded for engagement with the threaded portion of the valve chamber. Preferably this is a "free" or No. 2 screw-threaded fit so as to insure a proper seating of the ball valve against the valve seat. By rotating the valve mount about its longitudinal axis, the valve mount may be moved within the valve chamber along a straight line toward or away from the port 17 to cause the ball valve to engage or disengage the valve seat, depending upon the direction of rotation of the valve mount. When the valve mount is turned so as to move toward the right, as viewed in Figure 3, the ball valve will approach the valve seat and in due course will be firmly seated thereon. Since the ball valve is made of harder material than the valve body, the ball will not be scored by the valve seat. Since the ball engages the edge of the port, there is substantially a line engagement and there is no flat surface on the seat in engagement with the ball to become scored or scorched upon repeated closing of the valve.

As can best be seen in Figures 4–6, the end of the valve mount adjacent the valve seat is provided with eccentrically disposed openings 21 extending longitudinally thereof, spaced circumferentially around the ball valve. These openings, of which two are shown in the illustrative embodiment, may extend all of the way through the valve mount as separate openings but preferably they converge toward the other end of the valve mount into a centrally disposed passage 22. It will be evident that when the valve mount is turned to cause the ball valve to disengage the valve seat, there is a path of low resistance for the flow of fluid longitudinally through the valve mount.

The end of the valve mount opposite the ball valve is provided with a worm gear 23, preferably formed as an integral part of the mount. This worm gear engages a worm 24 located in the transverse bore 25 in the lower part of the valve body, as may best be seen in Figure 4. The worm is secured on the stem 15 adjacent the inner end thereof. Rotation of the stem, by manipulation of the hand wheel 14, will turn the worm, and engagement of the turning worm with the worm gear will result in rotating the valve mount about its longitudinal axis to move the ball valve toward or away from the valve seat, depending on the direction of the rotation of the hand wheel. In the illustrative embodiment the addendum circle diameter of the worm gear is slightly greater than the diameter of the threaded portion of the valve mount, and the outer end of the valve chamber bore 16 is of correspondingly larger diameter than the inner screw threaded end, so as to accommodate the gear. The dimension of the worm gear face is made such that the gear remains continuously in operative engagement with the worm as the valve mount is moved along its longitudinal axis from closed position of the valve to fully open position.

The inner end of the transverse bore 25 preferably is provided with a coaxial bore of reduced diameter which serves as a support and bearing for the inner end of the stem 15. The worm 24 and stem 15 are held against longitudinal movement in the assembled valve by engagement of the collar 27, secured on the stem, with the inner end of the bonnet 28, the latter preferably having screw threaded engagement with the transverse bore 25. The bonnet preferably is made of steel, and a fluid-tight joint may be obtained by use of a washer 29 of softer metal, for example aluminum, between the flange 30 on the bonnet and the oppositely disposed face on the valve body. The bonnet will be screwed in tightly to insure a fluid-tight joint. Surrounding the stem 15 and screw-threadedly engaging the outer end of the bonnet 28 is a stuffing nut 31 for compressing stem packing 32 around the stem to prevent leakage of fluid at this point.

It will be evident from the foregoing description that upon rotation of the stem 15, by manipulation of the hand wheel 14, the worm 24 will cause the valve mount 20 to be rotated about its longitudinal axis and, by reason of its screw-threaded engagement in the valve chamber bore 16, the valve mount will move in a straight line toward or away from the valve seat, the direction of movement of the valve mount depending on the direction of rotation of the hand wheel. When the valve mount is moved toward the valve seat, the flow of fluid through the valve is gradually reduced and flow is completely shut off when the ball valve 19 engages the valve seat 18. When the valve mount is moved in the opposite direction, the ball valve disengages the valve seat and fluid is free to flow through the valve, passing through the centrally disposed passage 22 and the eccentrically disposed openings 21 in the valve mount.

From the foregoing description it also will be evident that the valve may be easily and economically manufactured. The valve body 8 consists of a block of steel in which the aligned valve chamber bore 16, port 17, and fluid passage in portion 11 of the valve body are drilled. The inner end of the valve chamber bore 16 then is screw threaded. The valve mount 20 is separately constructed and the ball valve 19 is pressed into the bore 26 in the end thereof. The valve mount now is ready to be inserted and screwed into the valve chamber bore 16. The worm 24, secured on the stem 15, is inserted in the valve body through the transverse bore 25 which has been drilled in the valve body and screw threaded. The bonnet 28 is screwed into place and the stuffing nut 31 is screwed down to compress the stem packing 32. The collar 9 then is secured on the valve body 8, as by welding, to close the valve chamber, and the valve is ready for connection in a pipe line.

The invention herein disclosed may be variously modified and embodied within the scope of the subjoined claims.

I claim:

1. A valve for high pressure lines comprising, in combination, a valve body having a valve chamber therein with a port of reduced diameter at one end of the valve chamber, a valve seat surrounding the port, a valve mount disposed within the valve chamber, a portion of the valve mount being coaxial with the port and being externally screw-threaded and having screw-threaded engagement with the valve body for longitudinal movement therein upon rotation of the valve mount, a ball valve firmly secured coaxially in one end of the valve mount facing the valve seat, the cylindrical valve mount having a longitudinally extending opening for the passage of fluid therethrough when the valve is open, a worm gear connected to the valve mount so as to rotate and move axially therewith upon rotation of the valve mount and substantially coaxial with the threaded portion of the valve mount, the worm gear being axially spaced from the screw threads of the valve mount, a worm mounted within the valve body in engagement with the worm gear, and a stem extending from the worm outwardly through the wall of the valve body for turning the worm to turn the cylindrical valve mount within the valve chamber and thus cause the ball valve to engage and disengage the valve seat dependent on the direction of rotation of the valve mount.

2. A valve according to claim 1, in which it is the end portion of valve mount containing the ball valve that is screw-threaded, and in which the worm gear is at the opposite end of the valve mount.

3. A valve according to claim 1, in which the ball valve has a pressed fit in a coaxial bore in the end of the valve mount and in which the valve mount has a free fit screw-threaded engagement with the valve chamber to insure a tight seal between the ball valve and the valve seat when the valve mount is moved longitudinally to bring the ball valve into engagement with the valve seat.

4. A valve according to claim 1, in which the valve seat is a flat seat and in which the ball valve is of larger diameter than the port and is made of harder material than the valve seat.

5. A valve according to claim 1, in which the longitudinal opening through the valve mount comprises eccentrically disposed openings extending longitudinally of the valve mount spaced circumferentially around the ball valve and in which the eccentrically disposed openings converge into a single coaxially disposed opening in the other end of the valve mount.

References Cited in the file of this patent

UNITED STATES PATENTS

| | | |
|---|---|---|
| 260,030 | Johnson | June 27, 1882 |
| 807,476 | Leidecker | Dec. 19, 1905 |
| 1,154,811 | Savage | Sept. 28, 1915 |
| 1,693,676 | Spinelle | Dec. 4, 1928 |
| 1,773,110 | Meyers | Aug. 19, 1930 |
| 2,463,809 | Sacchini | Mar. 8, 1949 |
| 2,536,836 | Bowling | Jan. 2, 1951 |

FOREIGN PATENTS

| | | |
|---|---|---|
| 16,377 | Great Britain | of 1895 |
| 668,055 | Great Britain | of 1952 |